(12) United States Patent
Satoh et al.

(10) Patent No.: US 7,289,130 B1
(45) Date of Patent: Oct. 30, 2007

(54) AUGMENTED REALITY PRESENTATION APPARATUS AND METHOD, AND STORAGE MEDIUM

(75) Inventors: Kiyohide Satoh, Kawasaki (JP); Toshikazu Ohshima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 09/658,463

(22) Filed: Sep. 8, 2000

(30) Foreign Application Priority Data

Jan. 13, 2000 (JP) .............................. 2000-004716

(51) Int. Cl.
G09G 5/00 (2006.01)
(52) U.S. Cl. ...................................... 345/629; 345/633
(58) Field of Classification Search ................ 382/276; 345/633, 629, 435
See application file for complete search history.

(56) References Cited

U.S. PATENT DOCUMENTS

| | | | | |
|---|---|---|---|---|
| 5,684,943 | A | * | 11/1997 | Abraham et al. ........... 345/473 |
| 5,850,352 | A | | 12/1998 | Moezzi et al. |
| 6,166,744 | A | * | 12/2000 | Jaszlics et al. .............. 345/629 |
| 6,317,127 | B1 | * | 11/2001 | Daily et al. ................. 345/629 |
| 6,445,815 | B1 | * | 9/2002 | Sato .......................... 382/154 |
| 6,522,312 | B2 | * | 2/2003 | Ohshima et al. ............... 345/8 |
| 6,624,853 | B1 | * | 9/2003 | Latypov ..................... 348/722 |

OTHER PUBLICATIONS

Zsolt Szalavári, Erik Eckstein, Michael Gervautz, "Collaborative Gaming in Augmented Reality", Proceedings of VRST'98, pp. 195-204, Taipei, Taiwan.*

Toshikazu Ohshima, et al, "A $R^2$ Hockey: A Case Study of Collaborative Augmented Reality", Virtual Reality Annual International Symposium, 1998, Proceedings, Atlanta, Georgia, USA, Mar. 14-18, 1998, IEEE Comput. Soc, pp. 268-275.

Masayuki Kanbara, et al, "Real-Time Composition of Stereo Images for Video See-Through Augmented Reality", IEEE International Conference on Multimedia Computing and Systems, 1999, Florence Italy, Jun. 7-11, 1999, IEEE Comput. Soc, pp. 213-219.

* cited by examiner

Primary Examiner—Jin-Cheng Wang
(74) Attorney, Agent, or Firm—Fitzpatrick, Cella, Harper & Scinto

(57) ABSTRACT

A game state manager (201) manages the state of an AR game (information that pertains to rendering of each virtual object (102), the score of a player (101), the AR game round count, and the like). An objective viewpoint video generator (202) generates a video of each virtual object (102) viewed from a camera (103). An objective viewpoint video composition unit (203) generates a composite video of the video of the virtual object (102) and an actually sensed video, and outputs it to a display (106). A subjective viewpoint video generator (212) generates a video of the virtual object (102) viewed from an HMD (107). A subjective viewpoint video composition unit (213) generates a composite video of the video of the virtual object (102) and an actually sensed video, and outputs it to the HMD (107).

6 Claims, 17 Drawing Sheets

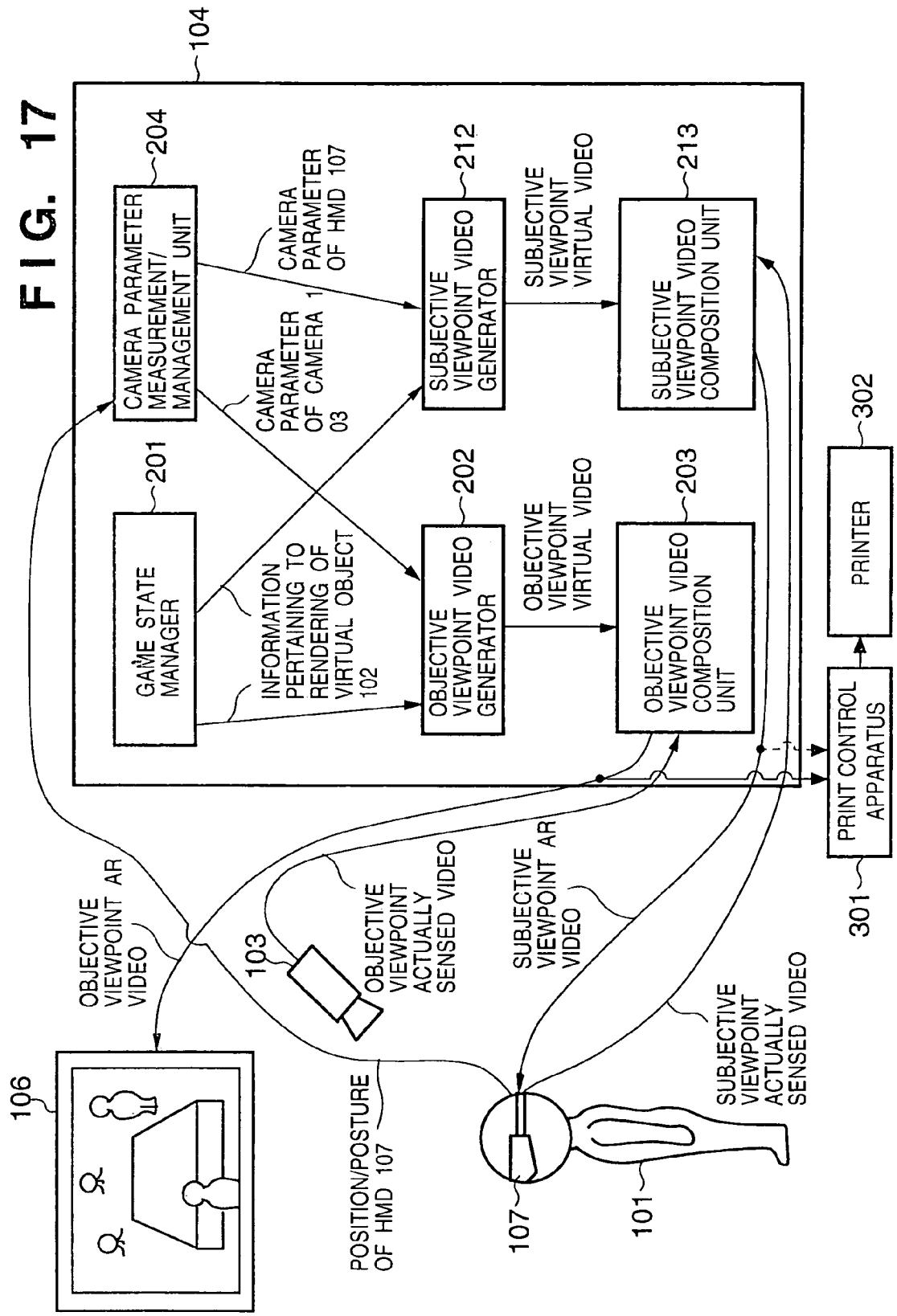

AUGMENTED REALITY PRESENTATION APPARATUS AND METHOD, AND STORAGE MEDIUM

FIELD OF THE INVENTION

The present invention relates to an augmented reality presentation apparatus and method, which superimposes a virtual object on a real space, and a storage medium.

More specifically, the present invention relates to an augmented reality presentation apparatus and method having a function of presenting a subjective augmented reality view for a player and generating a video of the same augmented reality space observed from an objective viewpoint, and a storage medium.

BACKGROUND OF THE INVENTION

A conventional augmented reality (AR) game system is constructed by an AR game apparatus for controlling an AR game, a head-mounted display (to be abbreviated as an HMD hereinafter) which the player of the AR game wears, and a display for presenting a subjective viewpoint video of the player to a third party other than the player.

The AR game apparatus controls the AR game, and generates information that pertains to rendering of a virtual object at the same time. The AR game apparatus generates a composite video as a video obtained by compositing a video of a virtual object generated using the information that pertains to rendering of the virtual object, and a video of a real space at the subjective viewpoint of the player, which is sensed by a camera attached to or built in the HMD.

The composite video is displayed on the display screen of the HMD. The player plays the AR game while reviewing this composite video. In addition to the player, the video at the subjective viewpoint of the player as this composite video is presented to a third party who watches this AR game in addition to the player by displaying that video on a display prepared for a third party other than the player.

Some TV programs use virtual studios in each of which a program stage set is built by virtual objects. In this virtual studio, a program video is generated by compositing an actually sensed video of characters of the program sensed by a set camera, and a video of the virtual studio seen at the position and posture of that camera.

In the conventional AR (augmented reality) game system, a third party (watcher) other than the player can only watch a video generated for the player (mainly at the subjective viewpoint of the player). For this reason, the watcher cannot watch videos of the AR game at viewpoints other than the subjective viewpoint of the player, e.g., the overall view of the AR game viewed from the objective viewpoint, a video of the AR game at a desired viewpoint of the watcher, and the like and can neither recognize the overall status of the AR game nor watch the AR game from a desired viewpoint.

Also, a program video using a virtual studio is generated at the objective viewpoint of a third party other than the characters of the program, but a video viewed from the subjective viewpoint of each character of the program cannot be generated.

It is, therefore, an object of the present invention to generate a video of an AR game at the subjective viewpoint of the player and also generate the overall view of the AR game viewed from an objective viewpoint and a video of the AR game viewed from a desired viewpoint of the watcher.

SUMMARY OF THE INVENTION

In order to achieve the above object, an augmented reality presentation apparatus described in claim 1 as a preferred embodiment of the present invention comprises the following arrangement.

That is, augmented reality presentation means for superimposing the virtual object viewed from a player's viewpoint position in the real space viewed from said player's viewpoint position;

the first video sensing means for sensing a video of the real space viewed from a first viewpoint position which differ from said player's viewpoint position;

the first video generation means for generating a video of the virtual object viewed from said first viewpoint position; and the first video composition means for compositing an augmented reality video viewed from said first viewpoint position on the basis of said videos of the real space and the virtual object viewed from said first viewpoint position.

As a result, a video that reviews an operating state of a virtual object by the player in the augmented reality space from the objective viewpoint position can be generated and presented to a third party other than the player.

The augmented reality presentation apparatus as a preferred embodiment of the present invention further comprises the following feature.

That is, said augmented reality presentation means further comprises:

the second video sensing means for sensing a video of the real space viewed from said player's viewpoint position;

the second video generation means for generating a video of the virtual object viewed from said player's viewpoint position;

the second video composition means for compositing an augmented reality video viewed from said player's viewpoint position on the basis of said videos of the real space and the virtual object viewed from said player's viewpoint position; and the display means for displaying to the player the augmented reality video viewed from said player's viewpoint position.

The augmented reality presentation apparatus as a preferred embodiment of the present invention further comprises the following feature.

That is, said augmented reality presentation means further comprises:

the second video generation means for generating a video of the virtual object viewed from said player's viewpoint position; and the display means for displaying to the player the video of the virtual object viewed from said player's viewpoint position on a display surface through which the player can visually see the real space.

The augmented reality presentation apparatus as a preferred embodiment of the present invention further comprises the following feature.

That is, information generation means for generating information that pertains to rendering of the virtual object, and in that said first video generation means and said second video generation means generate videos of the virtual object using the information that pertains to rendering of the virtual object.

The augmented reality presentation apparatus as a preferred embodiment of the present invention further comprises the following feature.

That is, said information generation means generates information of an outer appearance of the virtual object and information of a position/posture of the virtual object as the information that pertains to rendering of the virtual object.

The augmented reality presentation apparatus as a preferred embodiment of the present invention further comprises the following feature.

That is, parameters of said first video sensing means are known, and said first video generation means generates the video of the virtual object viewed from said first viewpoint position in accordance with the known parameters.

The augmented reality presentation apparatus as a preferred embodiment of the present invention further comprises the following feature.

That is, some of parameters of said first video sensing means are variable, said apparatus further comprises measurement means for measuring changes of the parameters, and said first video generation means generates the video of the virtual object viewed from said first viewpoint position in accordance with the parameters measured by said measurement means.

When the parameters of the objective viewpoint video sensing means, the objective viewpoint video generation means receives parameters from the measurement means, and generates an objective viewpoint video according to the received parameters.

The augmented reality presentation apparatus as a preferred embodiment of the present invention further comprises the following feature.

That is, the parameters of said first video sensing means measured by said measurement means include at least one of a viewpoint position/posture, and zoom ratio.

The objective viewpoint video of a virtual object is generated in accordance with camera parameters (external parameters (viewpoint position/posture) and internal parameters (zoom ratio, aspect ratio, optical axis central position, distortion ratio)) of the objective viewpoint video sensing means. The camera parameters measured by the measurement means preferably include all parameters to be changed dynamically of those parameters.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 17 is a block diagram showing the flow of processes of the tenth embodiment.

DETAILED DESCRIPTION OF THE PREFERRED EMBODIMENTS

Preferred embodiments of the present invention will now be described in detail in accordance with the accompanying drawings.

First Embodiment

As one preferred embodiment of the present invention, this embodiment will explain an augmented reality presentation apparatus and method, which present a state in which a player is playing an AR (augmented reality) game in an AR space to a third party (to be referred to as a watcher hereinafter) other than the player.

Figure 1:
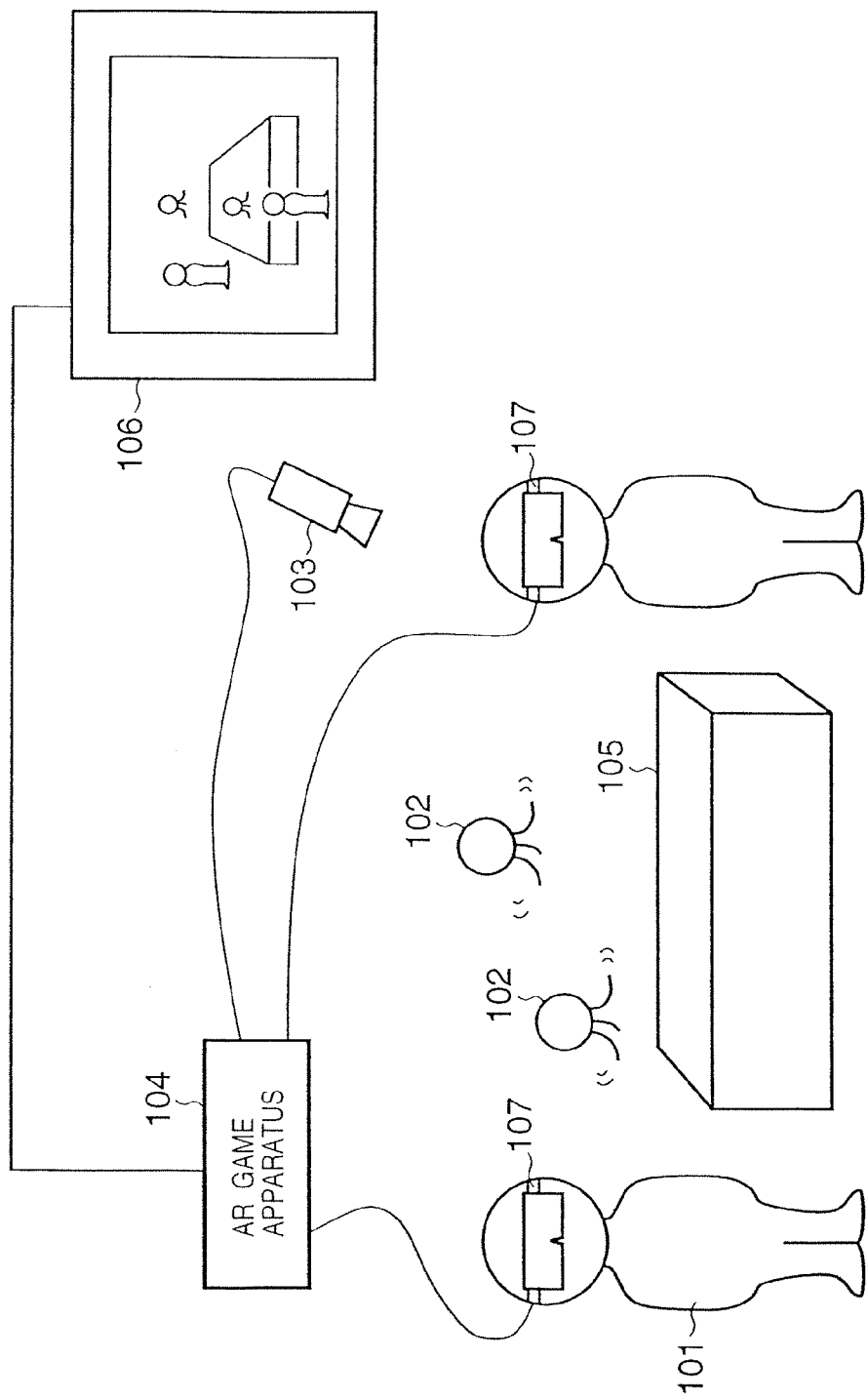
FIG. 1 is a view showing the first embodiment.

FIG. 1 shows this embodiment.

Reference numeral 101 denotes a player who is playing an AR (augmented reality) game, and wears a head-mounted display (to be abbreviated as an HMD hereinafter) 107 on his or her head. Note that the HMD 107 in this embodiment is of video see-through type which possesses video camera(s) inside or on it to capture the video(s) from the same viewpoint of the player's eye(s). Since the video see-through HMD is known to those who are skilled in the art, a detailed description thereof will be omitted.

Reference numeral 102 denotes virtual objects as characters which appear in the AR game. Each virtual object 102 is a three-dimensional virtual object rendered by computer graphics. The virtual objects 102 are generated by a method to be described later by an AR game apparatus 104. The player 101 can review a video obtained by superimposing the virtual objects 102 on a real space (to be referred to as an AR video hereinafter) from his or her subjective viewpoint by wearing the HMD 107 on his or her head, and can consequently play the AR game.

Reference numeral 103 denotes an objective viewpoint video sensing camera (to be simply referred to as a camera hereinafter) for sensing a state in which the player 101 is playing the AR game. In this embodiment, this camera 103 is fixed at a predetermined position and posture. A video sensed by the camera 103 (to be referred to as an objective viewpoint actually sensed video) is sent to the AR game apparatus 104 via a cable shown in FIG. 1. Note that the sensed video is an actually sensed video, which does not include any images of the virtual objects 102.

Reference numeral 104 denotes an AR game apparatus which controls the AR game, generates the videos of the virtual objects 102, and generates an AR video to be output to the HMD 107 and a display 106. Note that a video which the AR game apparatus 104 outputs to the HMD 107 is an AR video (to be referred to as a subjective viewpoint AR video hereinafter) obtained by compositing an actually sensed video of the real space (to be referred to as a subjective viewpoint actually sensed video hereinafter) input from the HMD 107, and videos of the virtual objects 102 viewed from the subjective viewpoint (to be referred to as subjective viewpoint virtual videos hereinafter). On the other hand, a video that the AR game apparatus 104 outputs to the display 106 is an AR video (to be referred to as an objective viewpoint AR video hereinafter) obtained by compositing videos of the virtual objects 102 viewed from the objective viewpoint (to be referred to as objective viewpoint virtual videos hereinafter), and the objective viewpoint actually sensed video sensed by the camera 103.

Reference numeral 105 denotes a table as a real object used as a stage in the AR game.

Reference numeral 106 denotes a display which displays the objective viewpoint AR video generated by the AR game apparatus 104 to present the playing state of the AR game by the player 101 to a third party other than the player 101, as described above.

Figure 5:
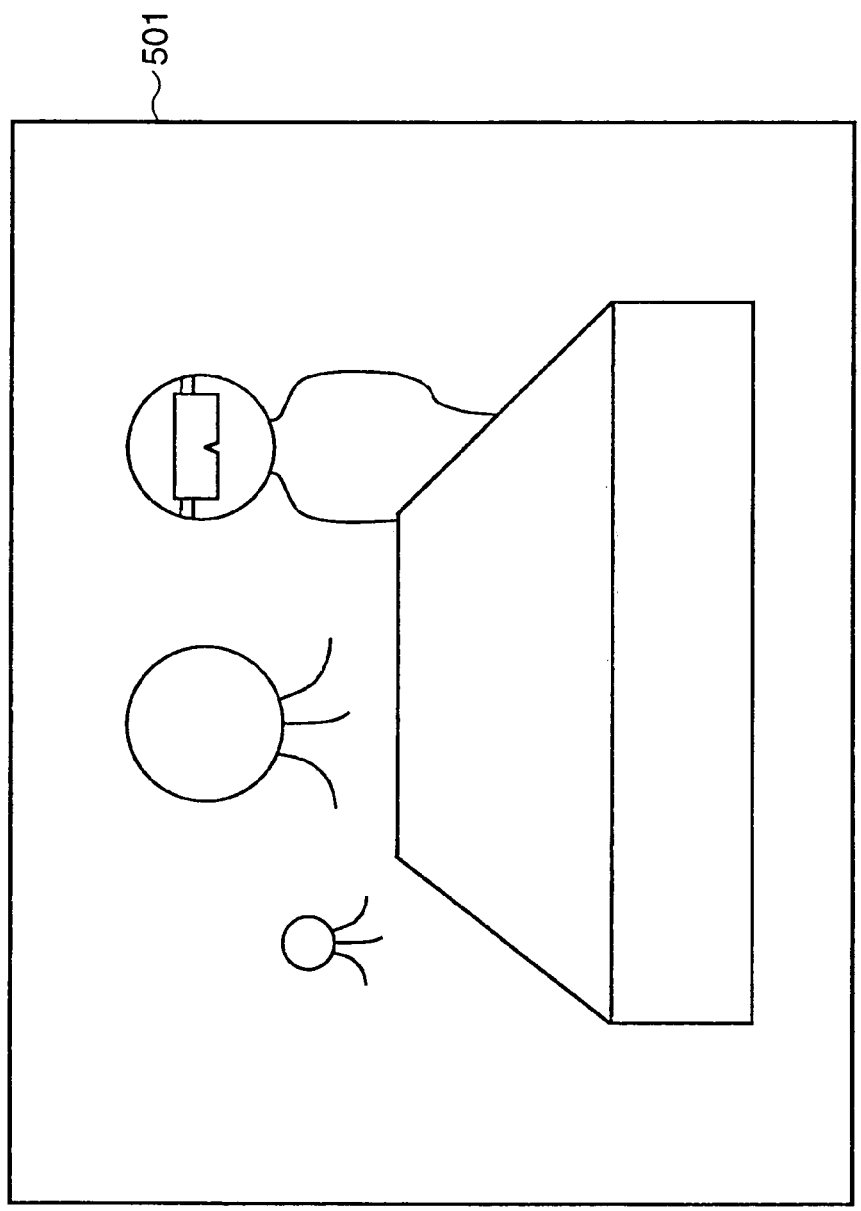
FIG. 5 is a view showing a video presented to a player in the first to fourth embodiments.

Reference numeral 107 denotes the aforementioned HMD which displays the subjective viewpoint AR video generated by the AR game apparatus 104 on its display screen 501 shown in FIG. 5. Also, the HMD 107 senses the subjective viewpoint actually sensed video viewed from the subjective viewpoint of the player 101. The sensed video is sent to the AR game apparatus 104 via a cable shown in FIG. 1.

Figure 2:
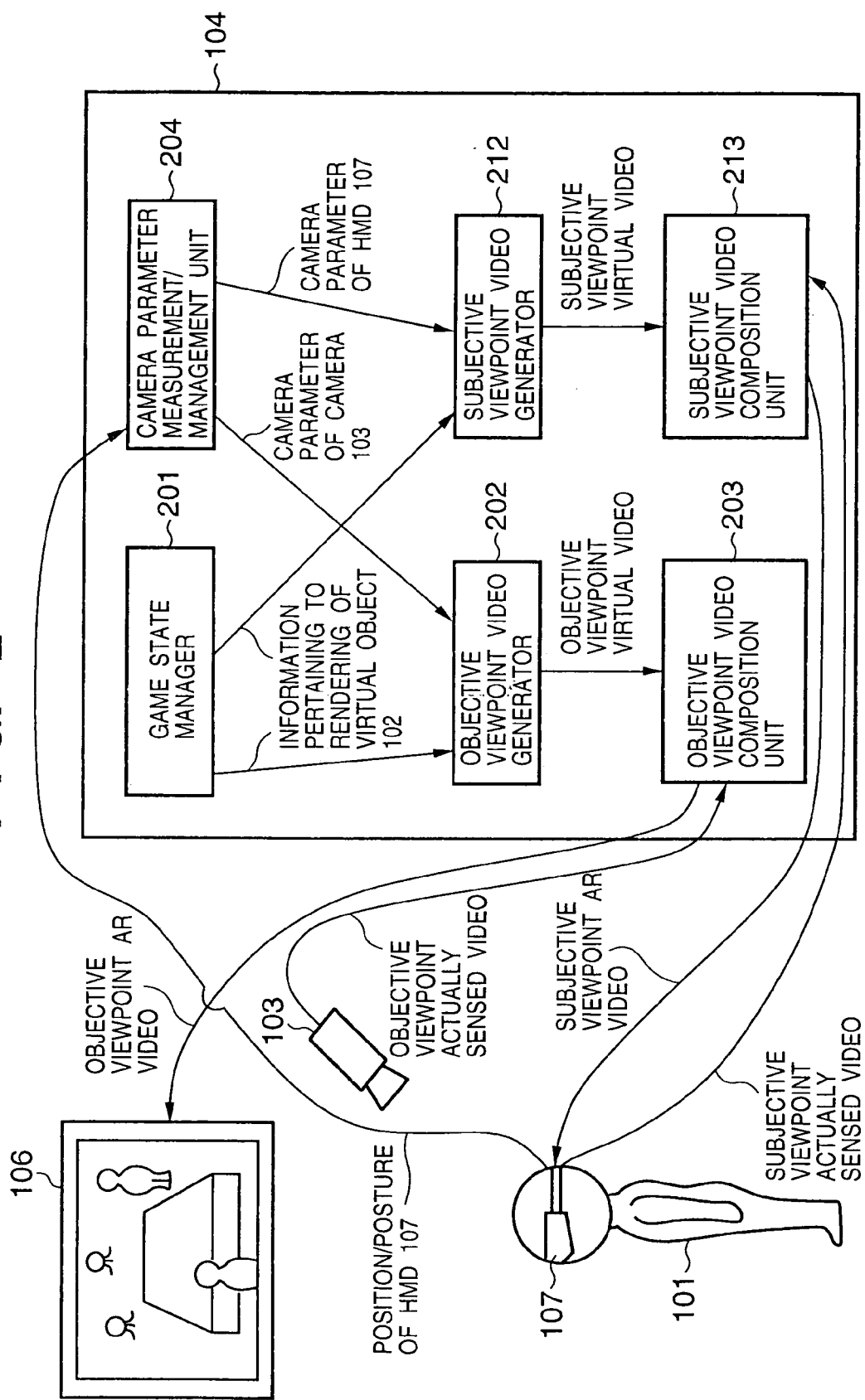
FIG. 2 is a block diagram showing the flow of processes of the first embodiment.

The flow of processes until the AR game apparatus 104 displays the subjective and objective AR videos respectively on the HMD 107 and display 106 based on the aforementioned arrangement will be explained below using FIG. 2 that shows the flow of such processes.

Reference numeral 201 denotes a game state manager incorporated in the AR game apparatus 104. The game state manager 201 manages the state of the AR game (information that pertains to rendering of the virtual objects 102, the score of the player 101, AR game round count, and the like). Note that the information that pertains to rendering of the virtual objects 102 includes information of the outer appearance of each virtual object 102, and information of the position/posture of each virtual object 102 in the world coordinate system.

The information of the outer appearance of each virtual object 102 is information that pertains to polygons which build the virtual object 102, i.e., the number of polygons, the coordinate values of polygons, the colors of polygons, and the like. When each virtual object 102 has undergone texture mapping, the information of the outer appearance of each virtual object 102 includes a texture size, texture file name, and the like.

Reference numeral 204 denotes a camera parameter measurement/management unit which measures/manages camera parameters as parameters of the HMD 107 and camera 103. The camera parameters to be managed by the camera parameter measurement/management unit 204 includes viewpoint position/posture information as external parameters, and information of the field angle, focal length, distortion, and the like as internal parameters. The camera parameter measurement/management unit 204 stores the internal parameters of the HMD 107 as known information. At the same time, the unit 204 measures the external parameters (information of the viewpoint position and posture) of the HMD 107, and manages the camera parameters of the HMD 107. Furthermore, the camera parameter measurement/management unit 204 manages camera parameters of the camera 103 as known information.

Reference numeral 202 denotes an objective viewpoint video generator built in the AR game apparatus 104. The objective viewpoint video generator 202 generates objective viewpoint virtual videos on the basis of the information that pertains to rendering of the virtual objects 102, which is input from the game state manager 201.

Reference numeral 203 denotes an objective viewpoint video composition unit built in the AR game apparatus 104, which generates an objective viewpoint AR video by compositing objective viewpoint virtual videos generated by the objective viewpoint video generator 202, and an objective viewpoint actually sensed video input from the camera 103.

Generation of the subjective viewpoint video will be explained below.

The game state manager 201 updates the information that pertains to rendering of the virtual objects 102 as needed, and outputs the updated information to a subjective viewpoint video generator 212. The subjective viewpoint video generator 212 generates videos of the virtual objects 102 (subjective viewpoint virtual video) viewed from the viewpoint position/posture of the HMD 107, on the basis of the information that pertains to rendering of the virtual objects 102, which is input from the game state manager 201, and the camera parameters of the HMD 107, which are input from the camera parameter measurement/management unit 204.

The generated subjective viewpoint virtual video is output to a subjective viewpoint video composition unit 213.

The subjective viewpoint video composition unit 213 receives from the HMD 107 the subjective viewpoint actually sensed video that the player 101 watches via the HMD 107. The subjective viewpoint video composition unit 213 generates a subjective viewpoint AR video as a composite video of this subjective viewpoint actually sensed video, and the subjective viewpoint virtual videos input from the subjective viewpoint video generator 212, and outputs that subjective viewpoint AR video to the HMD 107. The subjective viewpoint AR video is displayed on the display screen 501 of the HMD 107, and the player 101 plays the AR game while reviewing this subjective viewpoint AR video.

Generation of an objective viewpoint video will be explained below.

The game state manager 201 updates the information that pertains to rendering of the virtual objects 102 as needed, and outputs the updated information to the objective viewpoint video generator 202.

Since generation of the videos of the virtual objects 102 is implemented by the same processes as those in generation of the subjective viewpoint video, a detailed description thereof will be omitted.

The generated objective viewpoint virtual video is output to the objective viewpoint video composition unit 203.

The objective viewpoint video composition unit 203 receives an objective viewpoint actually sensed video from the camera 103. The objective viewpoint video composition unit 203 generates an objective viewpoint AR video as a composite video of this objective viewpoint actually sensed video, and the objective viewpoint virtual videos input from the objective viewpoint video generator 202, and outputs the objective viewpoint AR video to the display 106. This objective viewpoint AR video is displayed on the display 106, and the watcher can see the overall view of the AR game by reviewing this objective viewpoint AR video and can recognize the current situation of the AR game.

Figure 3:
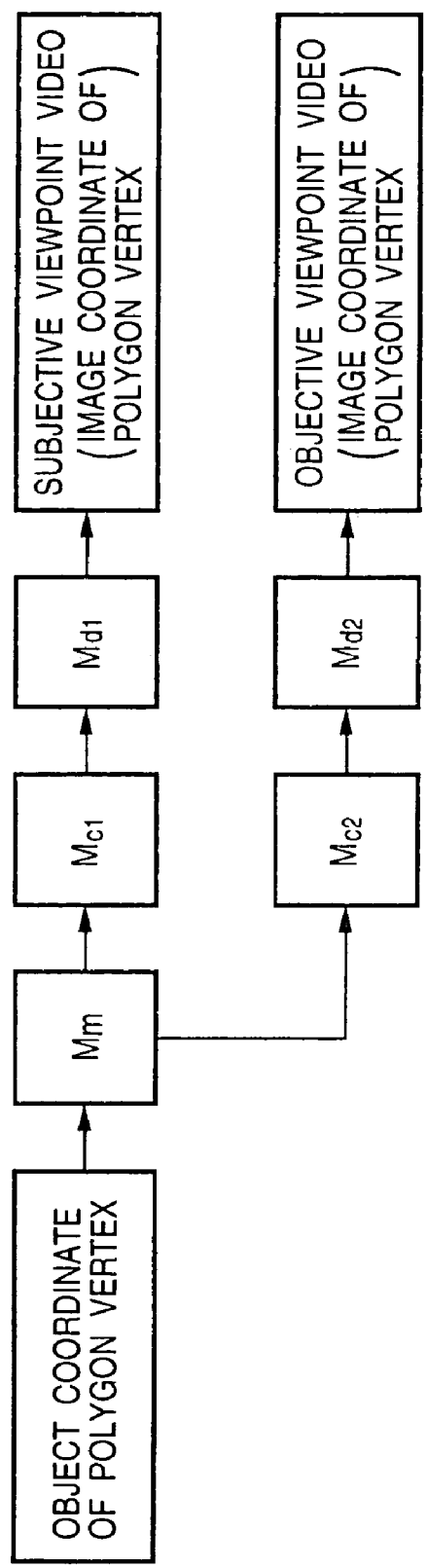
FIG. 3 is a diagram showing the generation process of a coordinate conversion matrix used to convert the object coordinate position of a virtual object into an image coordinate position viewed from a given viewpoint.

The image coordinate values of the vertices of the polygons that build each virtual object 102 viewed from each viewpoint (HMD 107 or camera 103) can be computed using the coordinate conversion matrix M1 or M2 from the object coordinate system into the image coordinate system. The generation process of such coordinate conversion matrix will be explained below using the block diagram shown in FIG. 3.

A coordinate conversion matrix Mm from the object coordinate system into a world coordinate system is computed on the basis of the information of the position/posture of each virtual object 102. Also, coordinate conversion matrices Mc1 and Mc2 from the world coordinate system into the corresponding camera coordinate systems are respectively computed on the basis of information of the positions/postures of respective viewpoints included in the camera parameters of the HMD 107 and camera 103. Furthermore, coordinate conversion matrices Md1 and Md2 for implementing perspective conversions from the corresponding camera coordinate systems into the image coordinate system are respectively computed on the basis of information such as the field angles, focal lengths, distortions, and the like included in the camera parameters of the HMD 107 and camera 103. The aforementioned coordinate conversion matrices are computed by the subjective viewpoint video generator 212 or objective viewpoint video generator 202.

The conversion matrix M1 from the object coordinate system into the image coordinate system of the HMD 107 is given by:

$$M1=Md1Mc1Mm$$

On the other hand, the conversion matrix M2 from the object coordinate system into the image coordinate system of the camera 103 is given by:

$$M2=Md2Mc2Mm$$

These computations are made by the subjective viewpoint video generator 212 or objective viewpoint video generator 202.

The present invention is not limit to these computations to make images. These computations are used, as factors that characterize subjective viewpoint and objective viewpoint.

The internal arrangement and operation of the AR game apparatus 104 will be explained below using FIG. 7 that shows the internal block diagram of the AR game apparatus 104.

Reference numeral 701 denotes a CPU, which executes a program code loaded onto a RAM 703. The CPU 701 also has an area for temporarily saving data during execution of a program.

Reference numeral 702 denotes a ROM which stores setups upon and after starting up the AR game apparatus 104, and a startup program code. Also, the ROM 702 stores character codes and the like used to display on the display screen 501 a score or the like output to the HMD 107 during the AR game.

Reference numeral 703 denotes a RAM which stores a program code of the AR game loaded from a floppy disk, CD-ROM, or the like as an external storage medium, polygon and texture data that build each virtual object 102, and the like. Note that the game state manager 201 refers to and manages polygon (texture) data that build each virtual object 102, which are stored in the RAM 703.

Reference numeral 704 denotes an interface (to be abbreviated as an I/F hereinafter), which is used to connect the AR game apparatus 104 to an external apparatus. The HMD 107, camera 103, and display 106 are all connected to the AR game apparatus 104 via this I/F 704.

Reference numeral 705 denotes a console which comprises a keyboard and a pointing device such as a mouse or the like. This console 705 allows the user to input setup commands of the AR game apparatus 104, and those for peripheral devices connected to the AR game apparatus 104.

Reference numeral 706 denotes a bus that connects the aforementioned units. Note that the game state manager 201, objective viewpoint video generator 202, objective viewpoint video composition unit 203, subjective viewpoint video generator 212, subjective viewpoint video composition unit 213, and camera parameter measurement/management unit 204 are connected to this bus 706, and are controlled via the bus 706 on the basis of the program code loaded onto the RAM 703, as described above.

Figure 8:
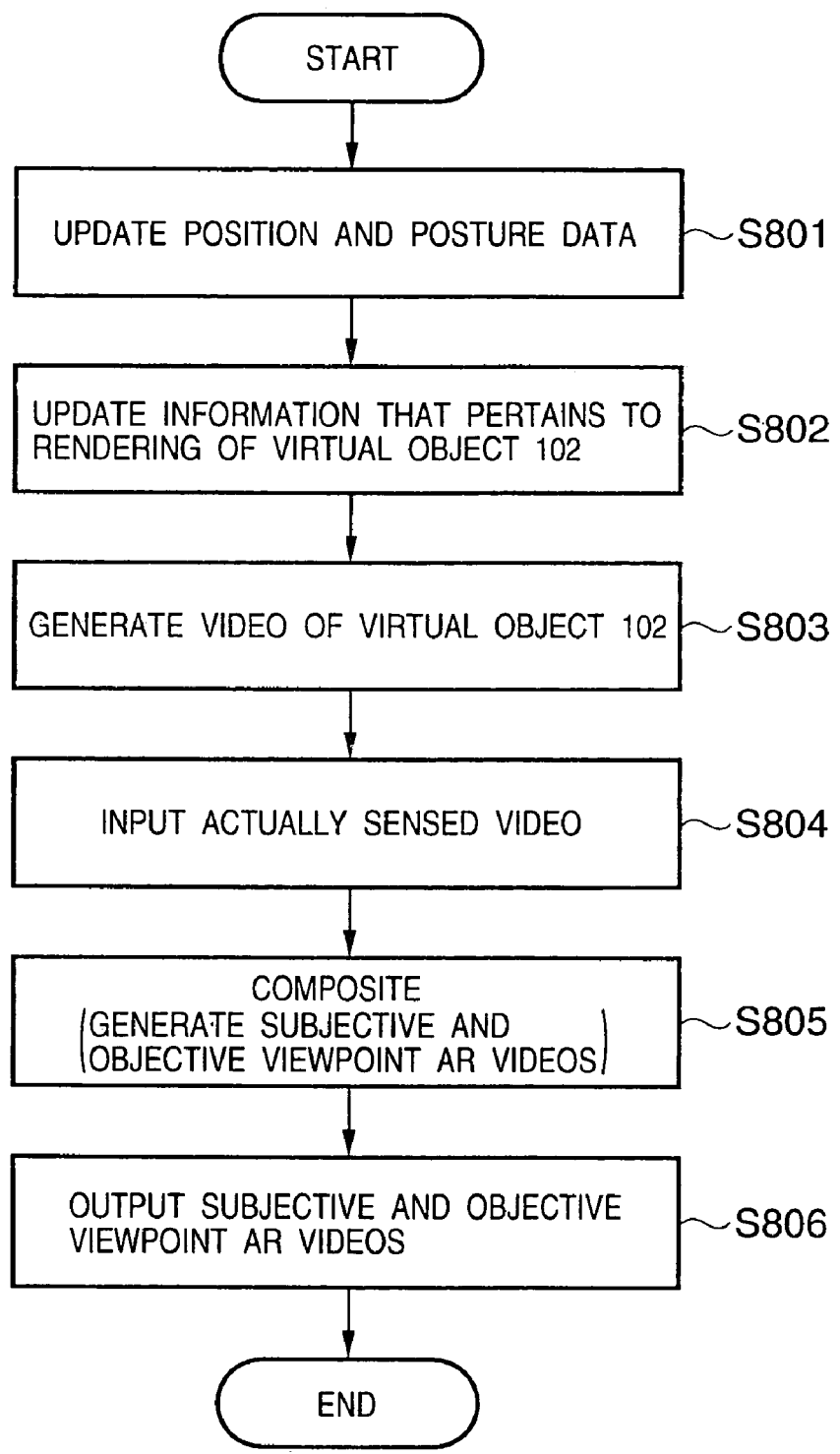
FIG. 8 is a flow chart for generating a subjective viewpoint AR video and an objective viewpoint AR video.

When the CPU 701 executes the program code loaded onto the RAM 703, the game state manager 201, objective viewpoint video generator 202, objective viewpoint video composition unit 203, subjective viewpoint video generator 212, subjective viewpoint video composition unit 213, and camera parameter measurement/management unit 204 execute the aforementioned processes, and output the subjective and objective viewpoint AR videos to the HMD 107 and display 106, respectively. The flow chart of this program code is shown in FIG. 8, and will be described below.

In step S801, the camera parameter measurement/management unit 204 updates the information of the viewpoint position/posture of the HMD 107.

In step S802, the game state manager 201 updates the game state (information that pertains to rendering of the virtual objects 102).

In step S803, the objective and subjective viewpoint video generators 202 and 212 respectively generate objective and subjective viewpoint videos.

In step S804, the objective and subjective viewpoint video composition units 203 and 213 respectively receive actually sensed videos sensed by the HMD 107 and 103.

In step S805, the objective and subjective viewpoint video composition units 203 and 213 respectively generate objective and subjective viewpoint AR videos.

In step S806, the objective and subjective viewpoint video composition units 203 and 213 respectively output the objective and subjective viewpoint AR videos to the display 106 and HMD 107.

The aforementioned processes are repeated until the AR game ends.

With the aforementioned arrangement of the apparatus, augmented reality presentation method, and program code, an objective viewpoint AR video can be presented to a third party other than the player 101 in the AR game using the video see-through HMD 107.

Second Embodiment

In the first embodiment, the HMD 107 is of video see-through type. However, if the HMD 107 is of optical see-through type, the player 101 can still play the AR game.

Figure 13:
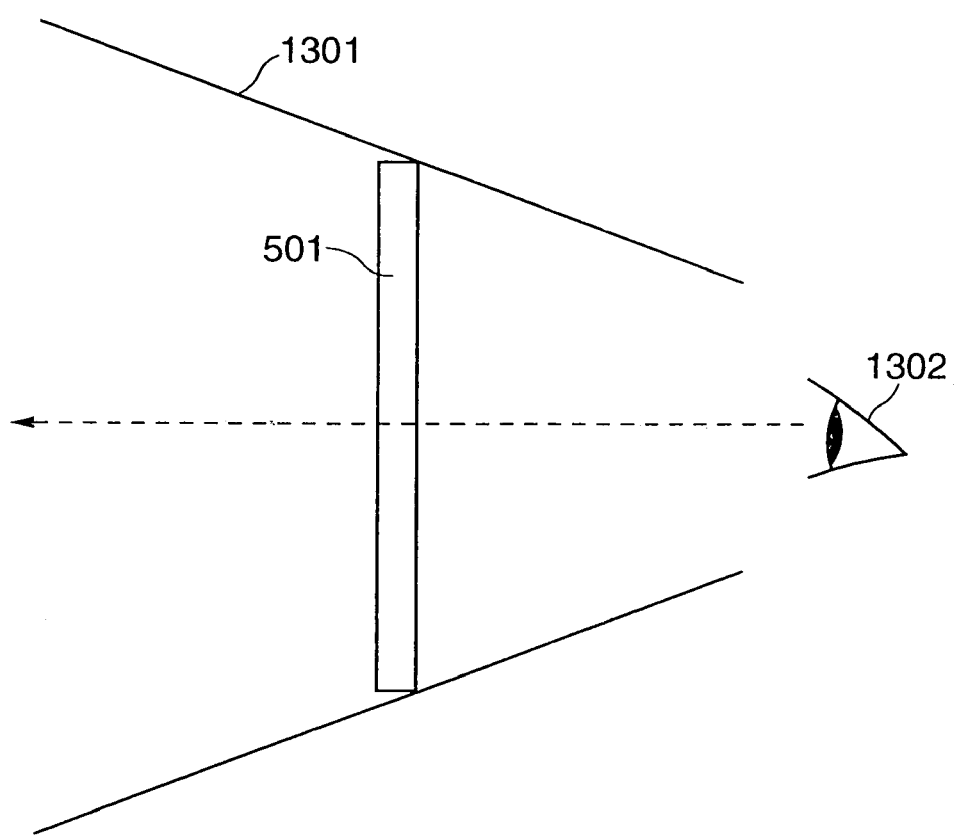
FIG. 13 is a view for explaining an optical see-through HMD.

FIG. 13 shows an optical see-through HMD 1301. Note that FIG. 13 schematically illustrates the HMD 1301, and the present invention is not limited to the size and shape shown in FIG. 13.

Reference numeral 1301 denotes an optical see-through HMD; and 1302, the eye of the player 101.

On the display screen 501, only videos of the virtual objects 102 (subjective viewpoint virtual videos) are displayed. On the other hand, a video of a real space is seen behind the display screen 501 when viewed from the position of the eye 1302. Hence, the player can review videos of the virtual objects 102 and the real space seen behind the display screen 501 when viewed from the position of the eye 1302 to overlap each other by observing the display screen 501.

Figure 14:
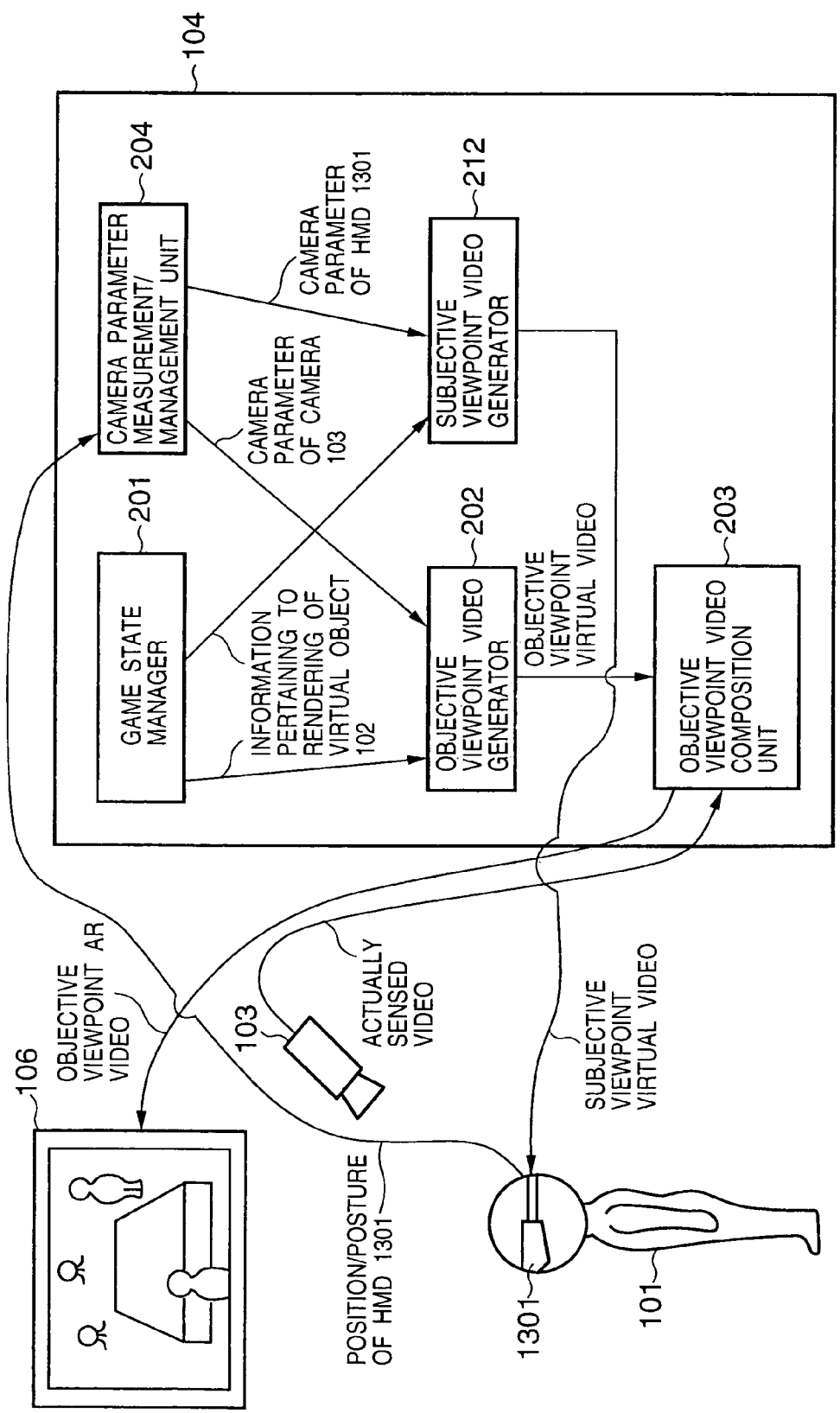
FIG. 14 is a block diagram showing the flow of processes of the second embodiment.

FIG. 14 is a block diagram showing the flow of processes of this embodiment.

A video output from the AR game apparatus 104 to the HMD 1301 is a subjective viewpoint virtual video alone, as described above. Hence, the HMD 1301 and subjective viewpoint video generator 212 are electrically connected via a cable, and a subjective viewpoint virtual video which is generated by the subjective viewpoint video generator 212 on the basis of the position and posture of the HMD 1301 is sent from the subjective viewpoint video generator 212 to the HMD 1301. Note that this embodiment has no subjective viewpoint video composition unit 213 in the first embodiment.

Also, the method of generating an objective viewpoint AR video is the same as that which has been explained in the first embodiment.

Figure 7:
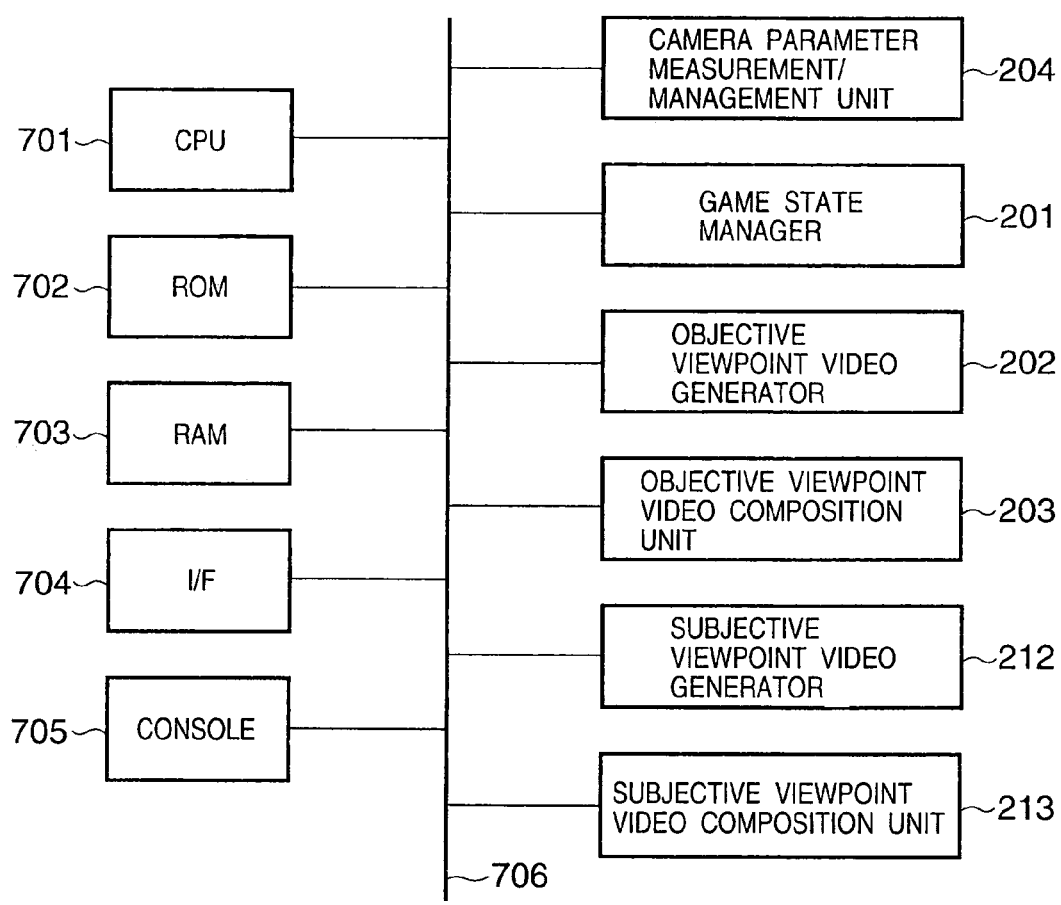
FIG. 7 is a block diagram showing the internal arrangement of an AR game apparatus.

The internal block diagram of the AR game apparatus 104 in this embodiment is substantially the same as that shown in FIG. 7, except that the objective viewpoint video composition unit 213 is removed from the arrangement shown in FIG. 7.

In the flow chart of this embodiment, steps S804, S805, and S806 in FIG. 8 are rewritten as follows. More specifically, upon generating a subjective viewpoint AR video (only videos of the virtual objects 102 based on the position and posture of the HMD 1301 in this embodiment) to be displayed on the HMD 1301, steps S804 and S805 are skipped. That is, in step S804 the objective viewpoint video composition unit 203 receives an actually sensed video sensed by the camera 103. In step S805, the objective viewpoint video composition unit 203 generates an objective viewpoint AR video. In step S806, the objective viewpoint video composition unit 203 outputs the objective viewpoint AR video to the display 106, and the subjective viewpoint video generator 212 outputs a subjective viewpoint virtual video to the HMD 1301.

The flow chart obtained by modifying the contents of FIG. 8 as described above is that in this embodiment, and this embodiment is controlled by a program code according to this modified flow chart.

With the aforementioned arrangement of the apparatus, augmented reality presentation method, and program code, an objective viewpoint AR video can be presented to a third party other than the player 101 in the AR game using the optical see-through HMD 1301.

Third Embodiment

In the first and second embodiments, the camera parameters of the camera 103 are fixed. That is, an objective viewpoint AR video is generated based on the camera parameters of the camera 103 which is fixed in position. The camera parameter data of the camera 103 are stored as permanent values in the RAM 703 of the AR game apparatus 104.

A case will be examined below wherein the viewpoint position, posture, and zooming ratio of the camera 103 are changed in real time to those that the player or a third party other than the player 101 (watcher or operator) wants. That is, a case will be examined below wherein the camera parameters of the camera 103 are changed in real time. Note that this embodiment uses a video see-through HMD as in the first embodiment. However, the HMD that can be used in this embodiment is not limited to the video see-through type, but an optical see-through HMD may be used, as can be seen from the description of the second embodiment and this embodiment.

When the position, posture, and zooming ratio of the camera 103 are to be changed in real time, a measurement means as a means for measuring the position, posture, and zooming ratio of the camera 103 must be added to the first embodiment.

Figure 4:
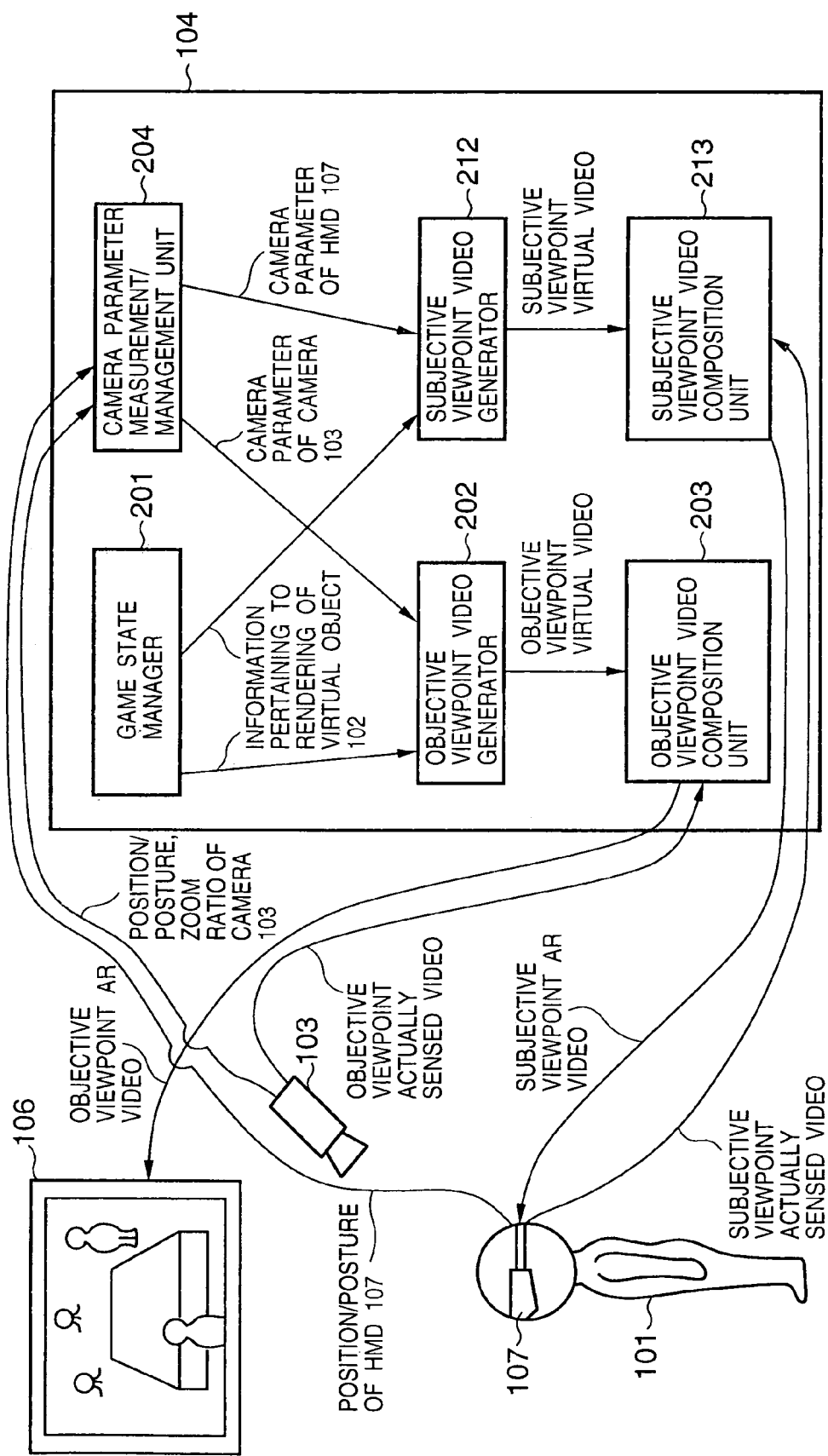
FIG. 4 is a block diagram showing the flow of processes of the third embodiment.

FIG. 4 is a block diagram showing the flow of processes in this embodiment. The flow of processes in this embodiment will be described below using FIG. 4.

Like in the first embodiment, in this embodiment the camera parameter measurement/management unit 204 measures and manages the camera parameters of the HMD 107, and holds some internal parameters of the camera 103 as known information. Unlike in the first embodiment, in this embodiment the camera parameter measurement/management unit 204 controls a sensor (not shown) attached to the camera 103 to measure the position, posture, and zooming ratio of the camera 103.

When the player 101 has changed the position, posture, and zooming ratio of the camera 103 via an interface (not shown), the camera parameter measurement/management unit 204 measures the position, posture, and zooming ratio of the camera 103. The measurement result data (the position, posture, and zooming ratio data of the camera 103) by the camera parameter measurement/management unit 204, and the known internal parameters are output to the objective viewpoint video generator 202. The objective viewpoint video generator 202 generates an objective viewpoint virtual video on the basis of the input camera parameters of the camera 103 in the same manner as in the process in the first embodiment. Other processes are the same as those in the first embodiment.

A control program code of the interface that changes the position, posture, and zooming ratio of the camera 103, and a control program code of the camera parameter measurement/management unit 204 are stored in the RAM 703 of the AR game apparatus 104.

The flow chart of this embodiment is the same as that shown in FIG. 8. However, in this embodiment the camera parameter measurement/management unit 204 updates the information of the viewpoint position and posture of the HMD 107 and the information of the viewpoint position, posture, and the zooming ratio of the camera 103 in step S801.

Internal parameter (zooming ratio) is fixed, position and posture may be variable. With the aforementioned arrangement of the apparatus, augmented reality presentation method, and program code, an objective viewpoint AR video can be generated based on data from the camera whose position and posture change.

Fourth Embodiment

In the first to third embodiments, only one camera is set. Alternatively, when a plurality of cameras are set and the camera to be used is switched, objective viewpoint AR videos from a plurality of positions and postures can be displayed on the display 106.

Figure 9:
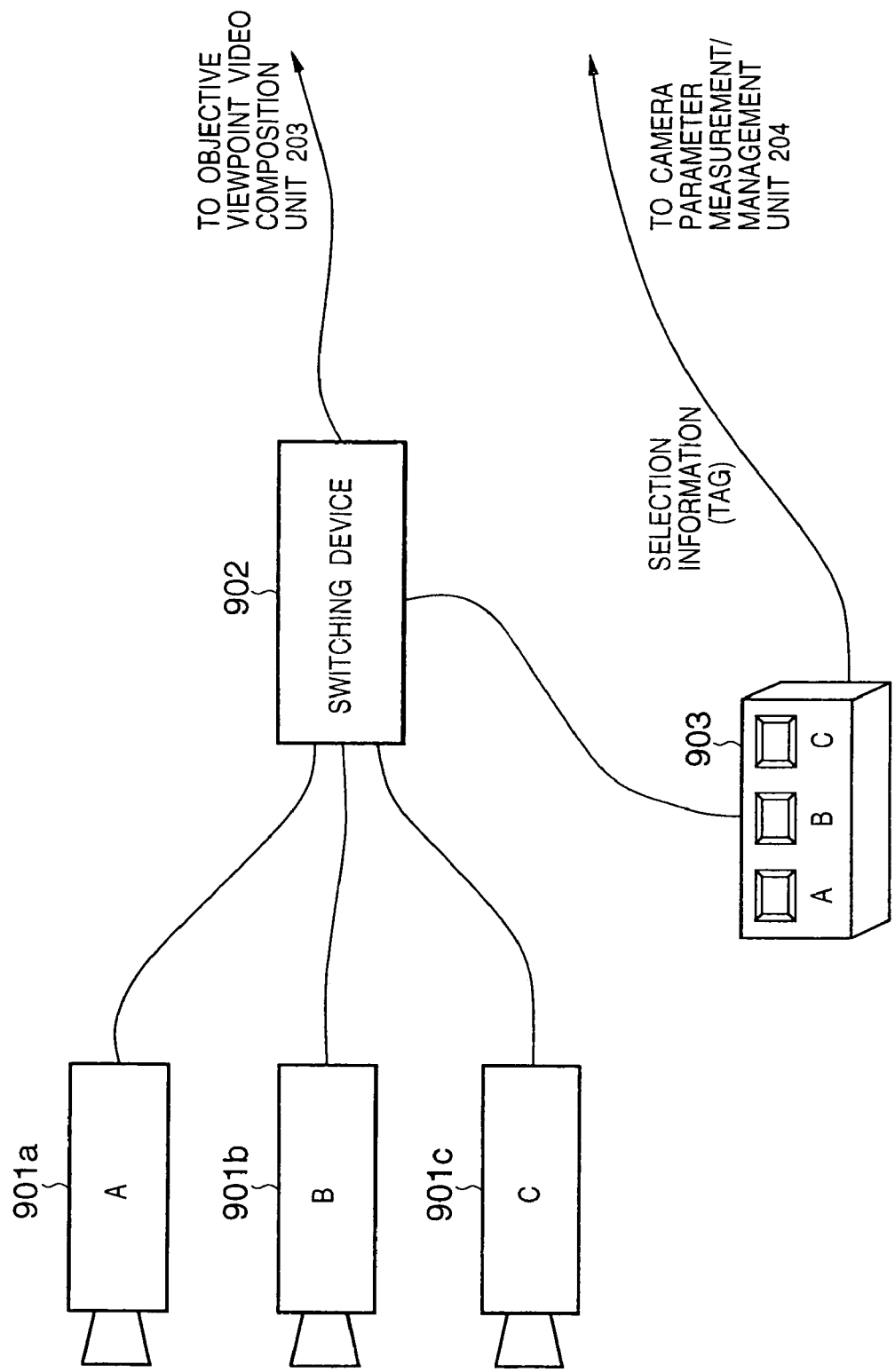
FIG. 9 is a diagram showing a camera system used in the fourth embodiment.

FIG. 9 shows a camera system in this embodiment. The camera system will be explained below using FIG. 9. Note that this embodiment sets three cameras.

Reference numerals 901a, 901b, and 901c denote cameras (cameras 901a, 901b, and 901c), the camera parameters (positions, postures, field angles, and the like) of which are fixed. The functions of these cameras are the same as those in the first and second embodiments. The camera parameters of these three cameras are set, as shown in FIG. 12, and these three sets of data are stored in the RAM 703 of the AR game apparatus 104 and are managed by the camera parameter measurement/management unit 204.

Figure 12:
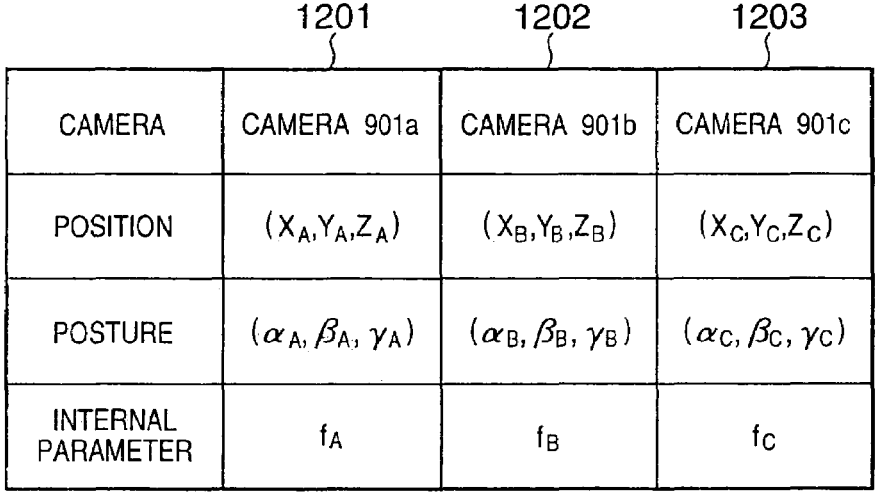
FIG. 12 is a table showing camera parameters of a plurality of cameras in the fourth embodiment.

Note that reference numerals 1201, 1202, and 1203 in FIG. 12 denote (selection information) tags corresponding to the cameras 901a, 901b, and 901c, which are used to select the camera to be used.

Reference numeral 902 denotes a camera switching device, which has a function of a switcher that sends only a signal (actually sensed video of a real space sensed by the selected camera) from the camera selected by a selector 903 to the video composition unit 203 via the switching device 902.

Reference numeral 903 denotes a selector which has the aforementioned function, and has three buttons (buttons A, B, and C) corresponding to the three cameras. When the user selectively presses one of these buttons, he or she can select the camera to be used. The selector 903 outputs selection information indicating the camera selected to the switching device 902 and camera parameter measurement/management unit 204. Note that the cameras 901a, 901b, and 901c are respectively selected by pressing buttons A, B, and C in FIG. 9 as the camera to be used.

The camera parameter measurement/management unit 204 selects the tag (one of the tags 1201, 1202, and 1203) of the camera mentioned above in accordance with the camera selection information input from the selector 903, and outputs the camera parameters of the selected camera to the objective viewpoint video generator 202. For example, when the camera 901b is used, the camera parameters of the camera 901b held by the tag 1202 are output to the objective viewpoint video generator 202 upon depression of button B.

Figure 10:
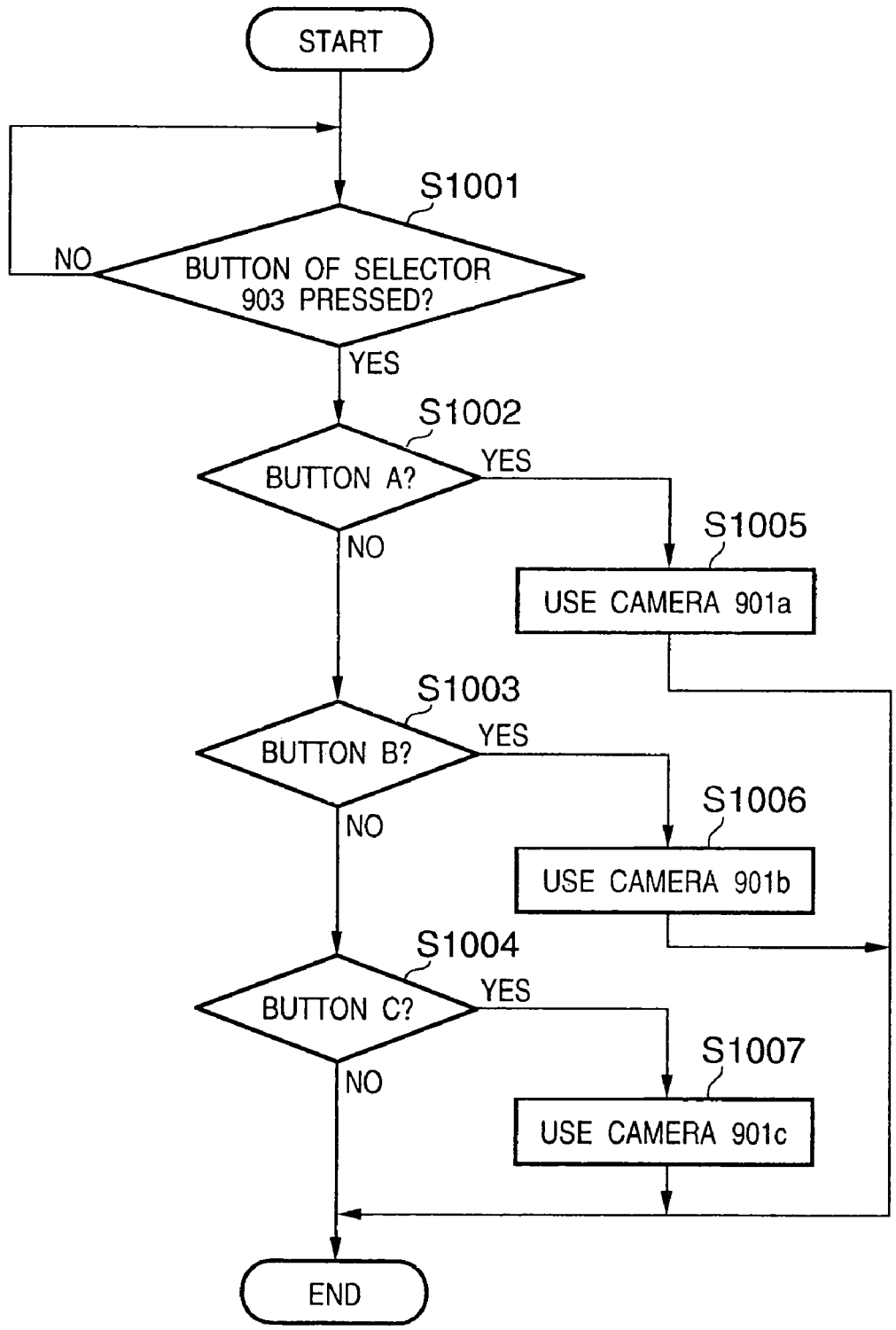
FIG. 10 is a flow chart in the fourth embodiment.

FIG. 10 is a flow chart showing the process of this embodiment.

It is checked in step S1001 if one of the buttons of the selector 903 has been pressed. Note that this process is repeated until one of the buttons is pressed.

In steps S1002, S1003, and S1004, the button pressed is determined. Assuming that button B has been pressed, the flow advances from step S1003 to step S1006.

In steps S1005, S1006, and S1007, an actually sensed video sensed by the camera corresponding to the pressed button is sent to the objective viewpoint video composition unit 203 via the switching device 902. Also, the selection information of the camera corresponding to the pressed button is sent to the camera parameter measurement/management unit 204.

A program code according to the aforementioned flow chart is stored in the internal memory (not shown) of the switching device 902.

Camera switching may be automatically performed in accordance with the progress of a game. In this case, the selector 903 is omitted, and the game state manager 201 outputs camera selection information to the camera switching device 902 and the camera parameter measurement/management unit 204. Camera switching can employ a method of switching cameras every predetermined time interval or a method of switching cameras in accordance with the progress of a scenario by presetting a camera having an appropriate camera angle every time the scenario progresses.

In this embodiment, the camera parameters of the three cameras are fixed. Alternatively, when the camera parameters of these cameras change in real time, the aforementioned arrangement of the apparatus, augmented reality presentation method, and program code can be applied. In this case, such application can be implemented by connecting the camera system of this embodiment to the AR game apparatus 104 in place of the camera 103 in the third embodiment.

With the aforementioned arrangement of the apparatus, augmented reality presentation method, and program code, a plurality of objective viewpoint AR videos sensed by a plurality of cameras can be displayed on the display 106.

Fifth Embodiment

Figure 6:
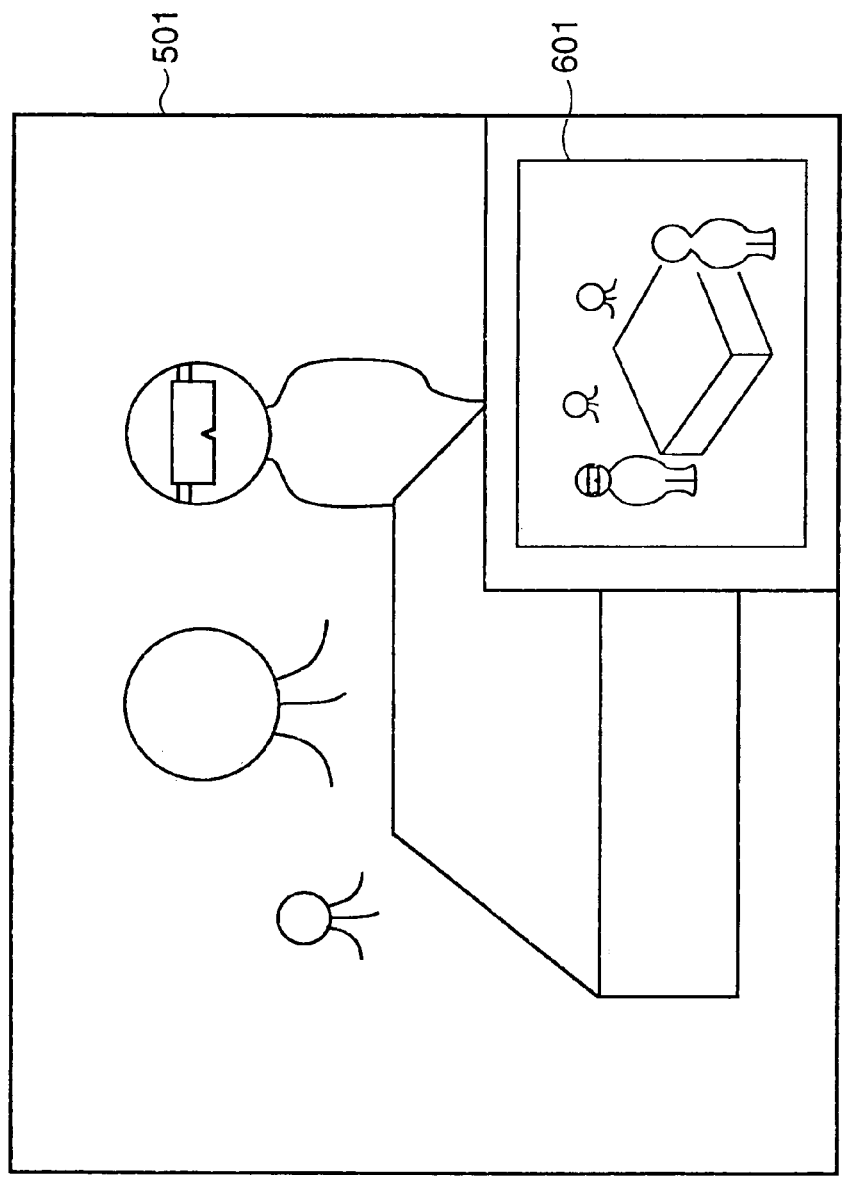
FIG. 6 is a view showing a video presented to a player in the fifth embodiment.

In the first to fourth embodiments, an objective viewpoint AR video is presented to a third party other than the player via the display 106 by outputting it to the display 106. Alternatively, the objective viewpoint AR video may be presented to the player 101. That is, a display area 601 shown in FIG. 6 is assured on the display screen 501 of the HMD (which can be of either video or optical see-through type) that the player 101 wears, and the objective viewpoint AR video is displayed there. In FIG. 6, a video displayed on this display screen 501 will be referred to as an augmented video hereinafter.

In order to generate this augmented video, a program code for setting the display area 601 on the display screen 501, and writing an objective viewpoint AR video on that display area 601 is stored in the RAM 703 of the AR game apparatus 104 in addition to the program code according to the flow chart shown in FIG. 8. As a result, by executing this program code, the augmented video can be displayed on the display screen 501.

Figure 11:
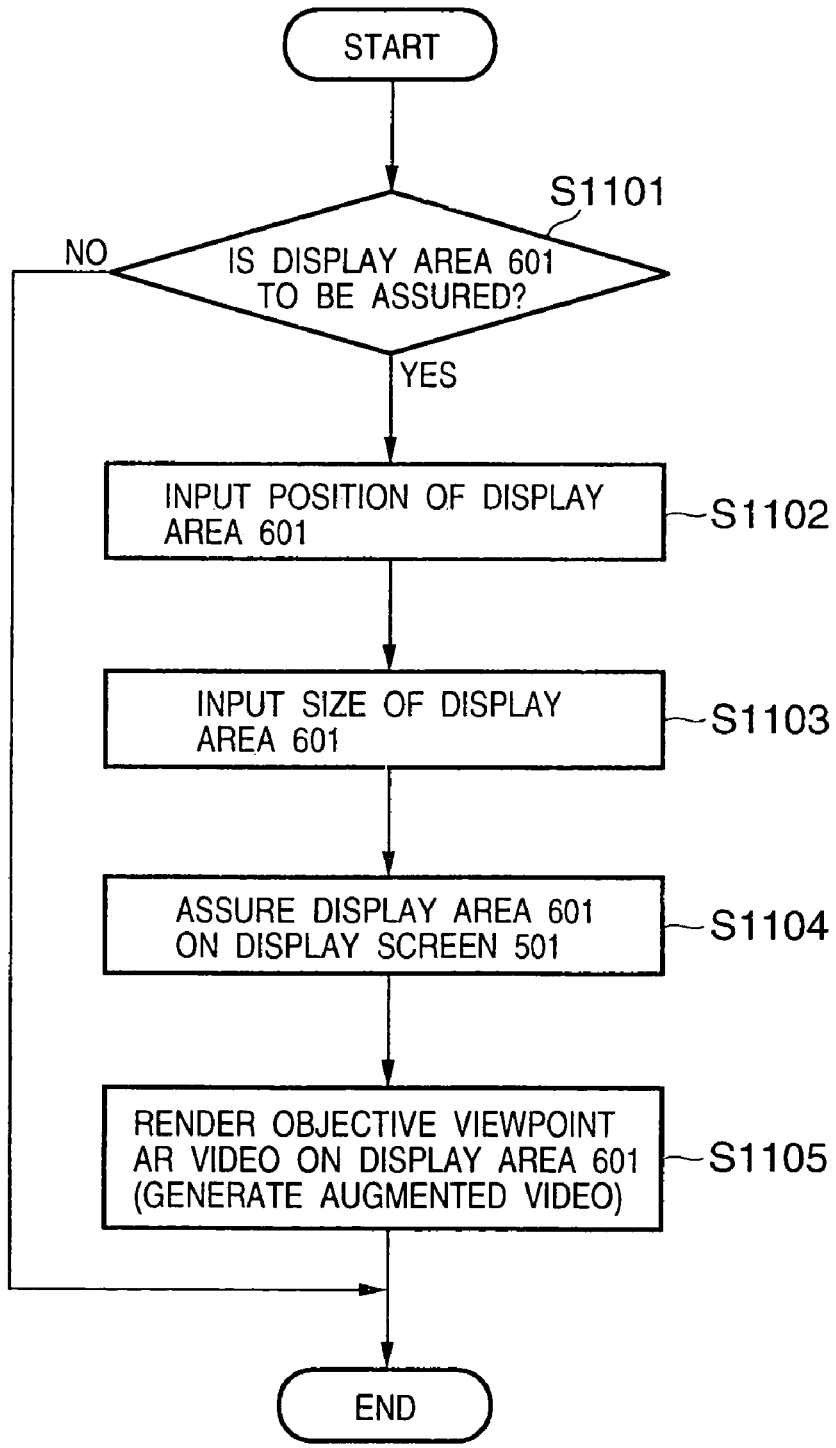
FIG. 11 is a flow chart in the fifth embodiment.

FIG. 11 is a flow chart of the program code for writing the objective viewpoint AR video on the display area 601 mentioned above.

It is checked in step S1101 if the display area 601 is assured. Selection as to whether or not the display area 601 is assured can be implemented by providing this selection switch to an operation device (not shown) used when the player 101 plays the AR game. Or such selection can be implemented by inputting a command indicating whether or not the display area 601 is assured from the console 705.

In step S1102, the display position of the display area 601 is input. The display position is input from the console 705. Alternatively, the player 101 may input the display position using the aforementioned operation device.

In step S1103, the size of the display area 601 is input. The size is input from the console 705. Alternatively, the player 101 may input the size using the aforementioned operation device.

In step S1104, the display area 601, the setups of which have been determined in steps S1102 and S1103, is assured on the display screen 501.

In step S1105, the objective viewpoint AR video generated by the objective viewpoint video composition unit 203 is rendered on the display area 601. As a consequence, the augmented video can be generated.

Note that this augmented video may be output to the display 106.

Selection of whether the display area 601 is set and the display position and size of the display area 601 may be automatically set/changed not by the player but in accordance with the progress of the game. In this case, the game state manager 201 determines these parameters.

The display area 601 may be the entire area of the display screen 501.

With the aforementioned arrangement of the apparatus, augmented reality presentation method, and program code, both the subjective and objective viewpoint AR videos can be presented to the player.

Sixth Embodiment

Figure 15:
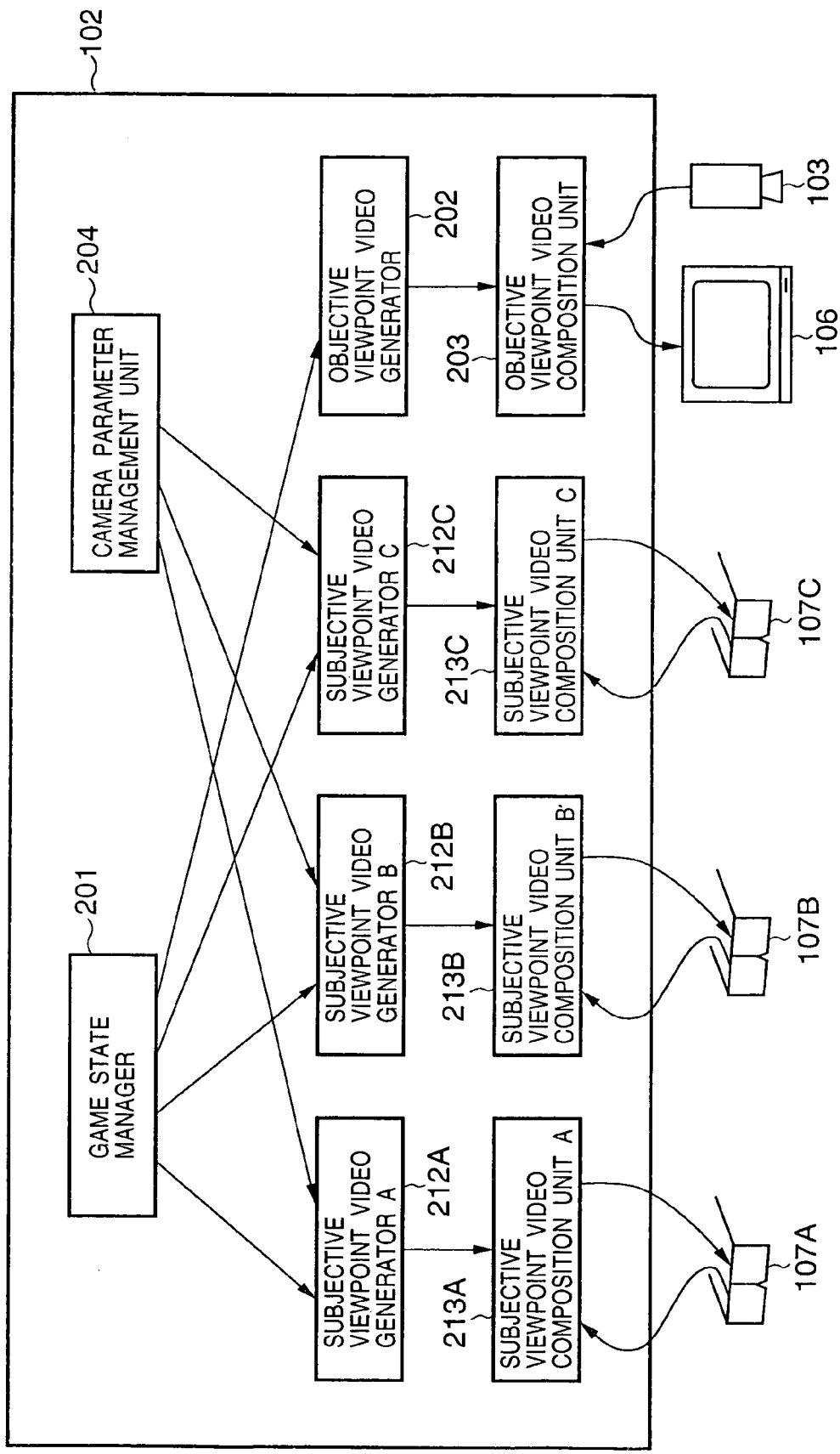
FIG. 15 is a block diagram showing the sixth embodiment.

A plurality of players 101 may join the AR game. In this case, subjective viewpoint AR videos from individual subjective viewpoints must be provided to the individual players. FIG. 15 shows the internal arrangement of the AR game apparatus for providing subjective viewpoint AR videos from the players' subjective viewpoints to the individual players. Note that the camera 103 is fixed in position, and the processes that pertain to the camera 103 and display are the same as those in the first embodiment.

FIG. 15 shows the internal arrangement for three players. Hence, the AR game apparatus 104 comprises HMDs 107A, 107B, and 107C, subjective viewpoint video composition units 213A, 213B, and 213C, and subjective viewpoint video generators 212A, 212B, and 212C in correspondence with three players a, b, and c. Three players a, b, and c respectively wear the HMDs 107A, 107B, and 107C. This embodiment uses a video see-through HMD, but an optical see-through HMD may be used. In this case, the subjective viewpoint video composition units for the three HMDs can be omitted.

When the AR game starts, the HMDs, subjective viewpoint video generators, and subjective viewpoint video composition units execute the same processes as those described in the first embodiment, and subjective viewpoint AR videos generated for the individual players are output to the HMDs 107A, 107B, and 107C that the players wear.

Note that the aforementioned arrangement of the apparatus and augmented reality presentation method are not limited to three players, as is obvious from the above description.

With the aforementioned arrangement of the apparatus and augmented reality presentation method, subjective viewpoint AR videos can be provided to a plurality of players.

Seventh Embodiment

In the fourth embodiment, a plurality of cameras 103 are set, but only one display 106 for displaying an objective viewpoint AR video is used.

However, the number of displays 106 is not limited to one, but a plurality of displays 106 may be used. That is, when objective viewpoint AR videos from the respective cameras 103 are separately displayed on a plurality of displays 106, the objective viewpoint AR videos from all the cameras 103 can be presented to a third party other than the player 101 using a plurality of displays 106.

Figure 16:
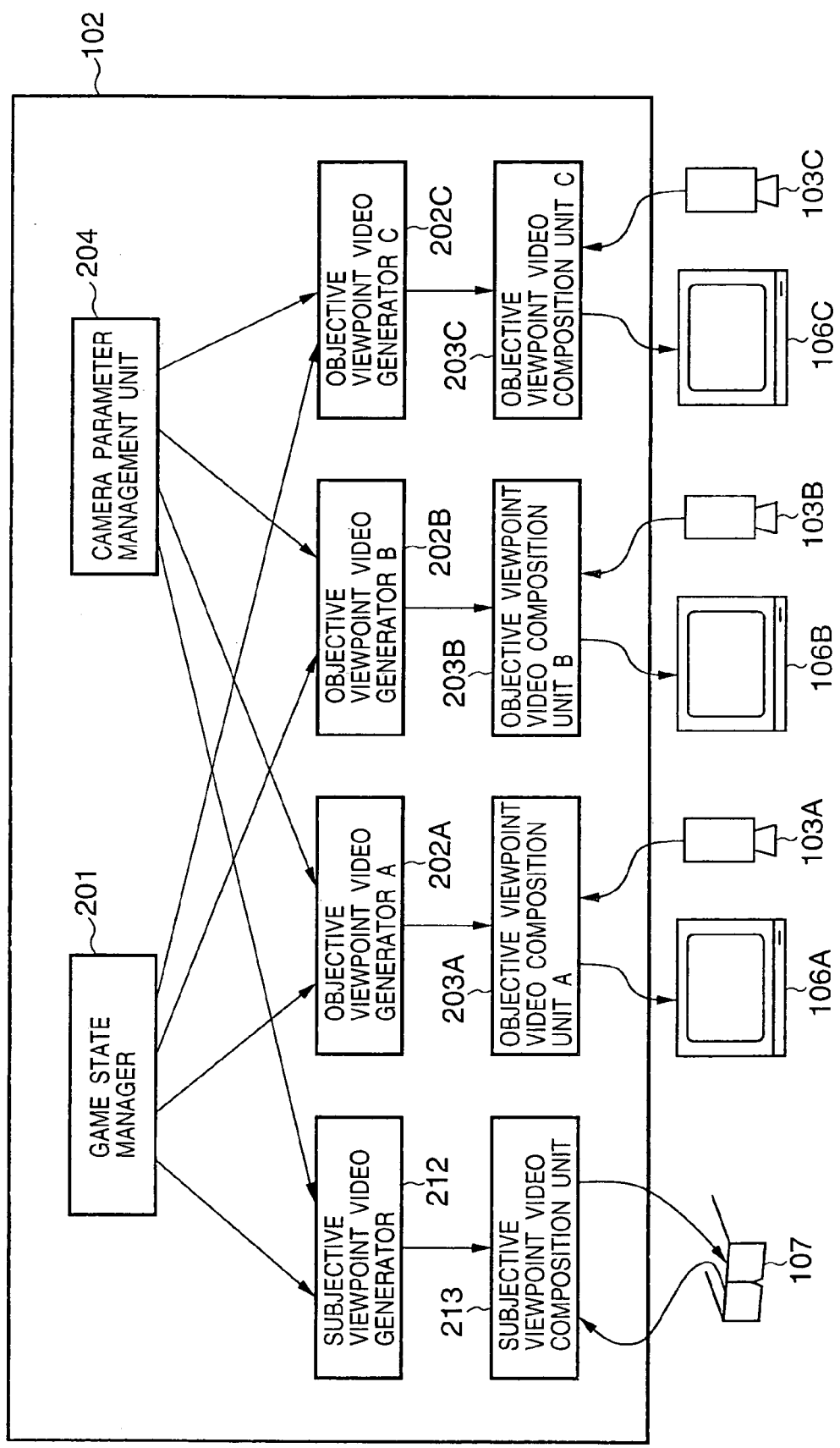
FIG. 16 is a block diagram showing the seventh embodiment.

In this embodiment, a case will be described below wherein a plurality of cameras 103 and a plurality of displays 106 are set. FIG. 16 shows the internal arrangement of the AR game apparatus 104 for displaying objective viewpoint AR videos from a plurality of cameras 103 on a plurality of displays 106.

In FIG. 16, three cameras 103A, 103B, and 103C are set, and displays 106A, 106B, and 106C for respectively displaying objective viewpoint AR videos from the cameras 103A, 103B, and 103C are set. Also, the AR game apparatus 104 comprises objective viewpoint video generators 202A, 202B, and 202C, and objective viewpoint video composition units 203A, 203B, and 203C corresponding to the displays 106A, 106B, and 106C so as to generate objective viewpoint AR videos corresponding to the displays 106A, 106B, and 106C.

When the AR game starts, the cameras, objective viewpoint video generators, and objective viewpoint video composition units execute the same processes as those in the first embodiment, and objective viewpoint AR videos from the cameras 103A to 103C are displayed on the displays 106A to 106C corresponding to these cameras 103A to 103C.

Note that the aforementioned arrangement of the apparatus and augmented reality presentation method are not limited to three displays 106, as is obvious from the aforementioned description.

With the aforementioned arrangement of the apparatus and augmented reality presentation method, all objective viewpoint AR videos from a plurality of cameras 103 can be presented to a third party other than the player 101 using a plurality of displays 106.

Eighth Embodiment

An apparatus that offers an AR video to the player 101 may be other than the game apparatus. That is, an AR apparatus which has substantially the same internal arrangement as that of the AR game apparatus 104 and stores a program code for implementing shopping in an AR space in place of a game program code may be used in place of the AR game apparatus 104. As a result, the player 101 can browse among presented products in shopping by observing a subjective viewpoint AR video from the AR apparatus, and that state is displayed on the display 106 as an objective viewpoint AR video.

Note that these subjective and objective viewpoint AR videos can be generated in the same manner as in the above embodiments.

Ninth Embodiment

When the camera parameters such as the position, posture, zoom ratio, and the like of the camera change, they may be estimated from an actually sensed video input from the camera 103 in place of the sensor. In this case, the camera parameter measurement/management unit 204 receives an actually sensed video, and estimates camera parameters by a known method. In consideration of estimation errors, the camera parameters measured by the sensor and those estimated by the camera parameter measurement/management unit 204 may be averaged to determine camera parameters to be used finally.

Tenth Embodiment

The generated objective viewpoint AR video can be not only displayed on the display 106 but also printed on a medium such as paper or a film. In this case, a print controller 301 (print control apparatus 301) and a printer 302 are added to the arrangement shown in each of the first to seventh embodiments. The 10th embodiment will be described with reference to FIG. 17 by exemplifying the arrangement of the first embodiment.

In the 10th embodiment, an objective viewpoint AR video output from an objective viewpoint video composition unit 203 is output to the printer controller 301 as well as the display 106. The print controller 301 stores the objective viewpoint AR video input at this time point and outputs the stored image to the printer 302 in accordance with a command input from a console 705. The printer 302 prints the input image on paper.

As in the seventh embodiment, when a plurality of objective viewpoint video composition units 203 are used, the print controller 301 receives objective viewpoint AR videos respectively output from the objective viewpoint video composition units 203. In this case, in accordance with a command input from the console 705 the print controller 301 selects an objective viewpoint AR video having a specific viewpoint, stores the objective viewpoint AR video input at this time point, and outputs the stored image to the printer 302. It is possible to print the subjective viewpoint AR video of each embodiment described above in accordance with the same processing as described above. In this case, a subjective viewpoint video composition unit 213 outputs the subjective viewpoint AR video to an HMD 107 and at the same time to the print controller 301.

It is also possible to simultaneously print objective viewpoint AR videos viewed from a plurality of viewpoint positions, objective viewpoint AR videos viewed from the same viewpoint at different times, or subjective viewpoint AR videos of the respective players on one paper sheet. In this case, the print controller 301 selects a viewpoint in accordance with a command input from the console 705 and stores the AR video viewed from the selected viewpoint. The print controller 301 determines a layout for printing a plurality of stored images on one paper sheet in accordance with a command input from the console 705 and outputs them to the printer 302.

The command may be automatically input to the print controller 301 in accordance with the progress of a game without using the console 705. In this case, a game state manager 201 transmits a command to the print controller 301. The command may be transmitted at a fixed timing preset in accordance with the progress of the game or a dynamic timing corresponding to the progress of the game such that the distance between the player and a virtual object 102 becomes a predetermined interval or less.

The camera 103 (or camera 901) can be located at an arbitrary position. The third party can easily grasp the state of the game when the camera is located at a position where the entire AR space can be observed from the bird-view position or a position where the upper half image (so-called bust shot) of the player can be sensed from the front.

As described above, according to the present invention, a video of the AR game viewed from the subjective viewpoint of the player can be generated, and, simultaneously, a video of the AR game viewed from an objective viewpoint to see the overall view of the game field or a video of the AR game viewed from a viewpoint the watcher wants can be generated.

As many apparently widely different embodiments of the present invention can be made without departing from the spirit and scope thereof, it is to be understood that the invention is not limited to the specific embodiments thereof except as defined in the appended claims.

What is claimed is:

1. An augmented reality presentation apparatus for superimposing a virtual object in a real space, characterized by comprising:
   objective viewpoint augmented reality presentation means for presenting to an observer an augmented reality view viewed from an objective viewpoint position, which differs from a viewpoint position of any player,
   wherein said objective viewpoint augmented reality presentation means includes
   first video sensing means for sensing a video of the real space, where a player experiencing an augmented reality exists, viewed from the objective viewpoint position, wherein the objective viewpoint position is a fixed position so that the player appears in the video sensed by said first video sensing means;
   first video generation means for generating a video of the virtual object viewed from the objective viewpoint position;
   first video composition means for composing an augmented reality video viewed from the objective viewpoint position on the basis of the sensed video of the real space sensed by said first video sensing means and the generated video of the virtual object generated by said first video generation means; and
   objective viewpoint video display means for displaying the composed augmented reality video composed by said first video composition means on a screen of an observer's display apparatus, the observer's display apparatus being separate from a head-mounted display worn by any player;
   wherein said apparatus further comprises:
   player's viewpoint augmented reality presentation means for presenting an augmented reality view viewed from a player's viewpoint;
   wherein said player's viewpoint augmented reality presentation means includes
   a head-mounted display having a screen;
   second video sensing means for sensing a video of the real space viewed from the player's viewpoint position;
   player's viewpoint position acquiring means for acquiring information indicating the player's viewpoint position;
   second video generation means for generating a video of the virtual object viewed from the player's viewpoint position using the information indicating the player's viewpoint position;
   second video composition means for composing an augmented reality video viewed from the player's viewpoint position on the basis of the sensed video of the real space sensed by said second video sensing means and the generated video of the virtual object generated by said second video generation means; and
   player's viewpoint video display means for displaying the composed augmented reality video composed by said second video composition means on the screen of said head-mounted display, wherein said head-mounted display includes said second video sensing means and said player's viewpoint video display means, and is worn by a player.

2. The apparatus according to claim 1, characterized by further comprising printing means,
   in that said first video composition means outputs the augmented reality video to said printing means,
   said printing means grabs one frame of the received video and prints out to the paper as a still image.

3. An augmented reality presentation method for superimposing a virtual object in a real space, characterized by comprising:
   an objective viewpoint augmented reality presentation step of presenting to an observer an augmented reality view viewed from an objective viewpoint position, which differs from a viewpoint position of any player;

wherein said objective viewpoint augmented reality presentation step includes a first video sensing step of sensing a video of the real space, where a player experiencing an augmented reality exists, viewed from the objective viewpoint position, wherein the objective viewpoint position is a fixed position so that the player appears in the video sensed in said first video sensing step;

a first video generation step of generating a video of the virtual object viewed from the objective viewpoint position;

a first video composition step of composing an augmented reality video viewed from the objective viewpoint position on the basis of the sensed video of the real space sensed in said first video sensing step and the generated video of the virtual object generated in said first video generation step, and an objective viewpoint video display step of displaying the composed augmented reality video composed in said first video composition step on a screen of an observer's display apparatus, the observer's display apparatus being separate from a head-mounted display worn by any player;

wherein said method further comprises:

a player's viewpoint augmented reality presentation step of presenting an augmented reality view viewed from a player's viewpoint position;

wherein said player's viewpoint augmented reality presentation step includes a second video sensing step of sensing a video of the real space viewed from the player's viewpoint position;

a player's viewpoint position acquiring step of acquiring information indicating the player's viewpoint position;

a second video generation step of generating a video of the virtual object viewed from the player's viewpoint position using the information indicating the player's viewpoint position;

a second video composition step of composing an augmented reality video viewed from the player's viewpoint position on the basis of the sensed video of the real space sensed in said second video sensing step and the generated video of the virtual object generated in said second video generation step; and a player's viewpoint video display step for displaying the composed augmented reality video composed in said second video composition step on a screen of a head-mounted display worn by a player.

4. The method according to claim 3, characterized by further comprising printing step, in that in said first video composition step the augmented reality video is output to means for printing, in said printing step one frame of the received video is grabbed and printed out to the paper as a still image.

5. A computer-readable storage medium storing a program code for superimposing a virtual object in a real space when said program code is loaded by a computer, characterized by comprising:

a program code of an objective viewpoint augmented reality presentation step of presenting to an observer an augmented reality view viewed from an objective viewpoint position, which differs from a viewpoint position of any player;

wherein said program code of the objective viewpoint augmented reality presentation step includes a program code of a first video sensing step of sensing a video of the real space, where a player who is experiencing an augmented reality exists, viewed from the objective viewpoint position, wherein the objective viewpoint position is a fixed position so that the player appears in the video sensed in said first video sensing step;

a program code of a first video generation step of generating a video of the virtual object viewed from the objective viewpoint position;

a program code of a first video composition step of composing an augmented reality video viewed from the objective viewpoint position on the basis of the sensed video of the real space sensed in said first video sensing step and the generated video of the virtual object generated in said first video generation step; and a program code for an objective viewpoint video display step of displaying the composed augmented reality video composed in said first video composition step on a screen of an observer's display apparatus, the observer's display apparatus being separate from a head-mounted display worn by any player, wherein said storage medium further stores:

a program code for a player's viewpoint augmented reality presentation step of presenting an augmented reality view viewed from a player's viewpoint position;

wherein said program code for the player's viewpoint augmented reality presentation step includes a program code for a second video sensing step of sensing a video of the real space viewed from the player's viewpoint position;

a program code for a player's viewpoint position acquiring step of acquiring information indicating the player's viewpoint position;

a program code for a second video generation step of generating a video of the virtual object viewed from the player's viewpoint position using the information indicating the player's viewpoint position;

a program code for a second video composition step of composing an augmented reality video viewed from the player's viewpoint position on the basis of the sensed video of the real space sensed in said second video sensing step and the generated video of the virtual object generated in said second video generation step; and a program code for a player's viewpoint video display step of displaying the composed augmented reality video composed in said second video composition step on a screen of a head-mounted display worn by the player.

6. An augmented reality presentation apparatus for superimposing a virtual object in a real space, characterized by comprising:

an objective viewpoint augmented reality presentation unit adapted to present to an observer an augmented reality view viewed from an objective viewpoint position, which differs from a viewpoint position of any player, wherein the objective viewpoint augmented reality presentation unit includes a first video sensing unit adapted to sense a video of the real space, where a player experiencing an augmented reality, viewed from the objective viewpoint position, wherein the objective viewpoint position is a fixed position so that the player appears in the video sensed by said first video sensing unit;

a first video generation unit adapted to generate a video of the virtual object viewed from the objective viewpoint position;

a first video composition unit adapted to compose an augmented reality video viewed from the objective viewpoint on the basis of the sensed video of the real space sensed by said first video sensing unit and the generated video of the virtual object generated by said first video generation unit; and an objective viewpoint video display unit adapted to display the composed augmented reality video composed by said first video composition unit on a screen of an observer's display apparatus, the observer's display apparatus being separate from a head-mounted display worn by any player;

wherein the apparatus further comprises;

a player's viewpoint augmented reality presentation unit adapted to present an augmented reality view viewed from a player's viewpoint position;

wherein the player's viewpoint augmented reality presentation unit includes:

a head-mounted display having a screen;

a second video sensing unit adapted to sense a video of the real space viewed from the player's viewpoint position;

a player's viewpoint position acquiring unit adapted to acquire information indicating the player's viewpoint position;

a second video generation unit adapted to generate a video of the virtual object viewed from the player's viewpoint position using the information indicating the player's viewpoint position;

a second video composition unit adapted to compose an augmented reality video viewed from the player's viewpoint position on the basis of the sensed video of the real space sensed by said second video sensing unit and the generated video of the virtual object generated by said second video generation unit; and a player's viewpoint video display unit adapted to display the composed augmented reality video composed by said second video composition unit on the screen of said head-mounted display, wherein said head-mounted display includes said second video sensing unit and said player's viewpoint video display unit, and is worn by a player.

* * * * *